(12) United States Patent
Kato et al.

(10) Patent No.: US 10,442,283 B2
(45) Date of Patent: Oct. 15, 2019

(54) VEHICLE BODY STRUCTURE

(71) Applicant: HONDA MOTOR CO., LTD., Tokyo (JP)

(72) Inventors: Takashi Kato, Wako (JP); Ken Yasui, Wako (JP); Koichi Takahashi, Wako (JP); Kenji Inagaki, Wako (JP); Hiroki Hayata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/058,119

(22) Filed: Aug. 8, 2018

(65) Prior Publication Data
US 2019/0047393 A1 Feb. 14, 2019

(30) Foreign Application Priority Data
Aug. 9, 2017 (JP) .................................. 2017-154696

(51) Int. Cl.
B60K 1/04 (2019.01)
B60L 50/64 (2019.01)

(52) U.S. Cl.
CPC ............... B60K 1/04 (2013.01); B60L 50/64 (2019.02); B60K 2001/0416 (2013.01)

(58) Field of Classification Search
CPC ............. B60K 1/04; B60K 2001/0405; B60K 2001/0416; B60K 2001/0438; B60K 2001/045; B60L 50/50; B60L 50/60; B60L 50/64; B60L 50/66
USPC ....................................................... 180/68.5
See application file for complete search history.

(56) References Cited

U.S. PATENT DOCUMENTS

| 5,549,984 | A | * | 8/1996 | Dougherty | ........ | H01M 10/4207 |
| | | | | | | 307/10.7 |
| 9,090,218 | B2 | * | 7/2015 | Karashima | ............... | B60K 1/04 |
| 9,527,378 | B2 | * | 12/2016 | Nozaki | ................... | B60L 50/66 |
| 2017/0087972 | A1 | | 3/2017 | Hara et al. | | |

FOREIGN PATENT DOCUMENTS

| JP | 2005-093299 A | 4/2005 |
| JP | 2013-018429 A | 1/2013 |
| JP | 2014-080119 A | 5/2014 |
| JP | 2017-069034 A | 4/2017 |

OTHER PUBLICATIONS

Japanese Office Action with English translation dated Jul. 2, 2019 (10 pages).

* cited by examiner

Primary Examiner — John D Walters
(74) Attorney, Agent, or Firm — Rankin, Hill & Clark LLP

(57) ABSTRACT

A vehicle body structure includes: a recess formed in a rear floor panel of a trunk of a vehicle; a drive power supply device that supplies power to drive the vehicle; and an auxiliary power supply device that supplies power to auxiliary machinery mounted on the vehicle, wherein the auxiliary power supply device is configured as an auxiliary power supply device structure by being fixed to a pedestal formed in the recess, and the drive power supply device is disposed side by side in a vehicle width direction with the auxiliary power supply device in the recess, and the auxiliary power supply device structure has a rear end positioned behind a rear end of the drive power supply device in a vehicle front-rear direction.

8 Claims, 8 Drawing Sheets

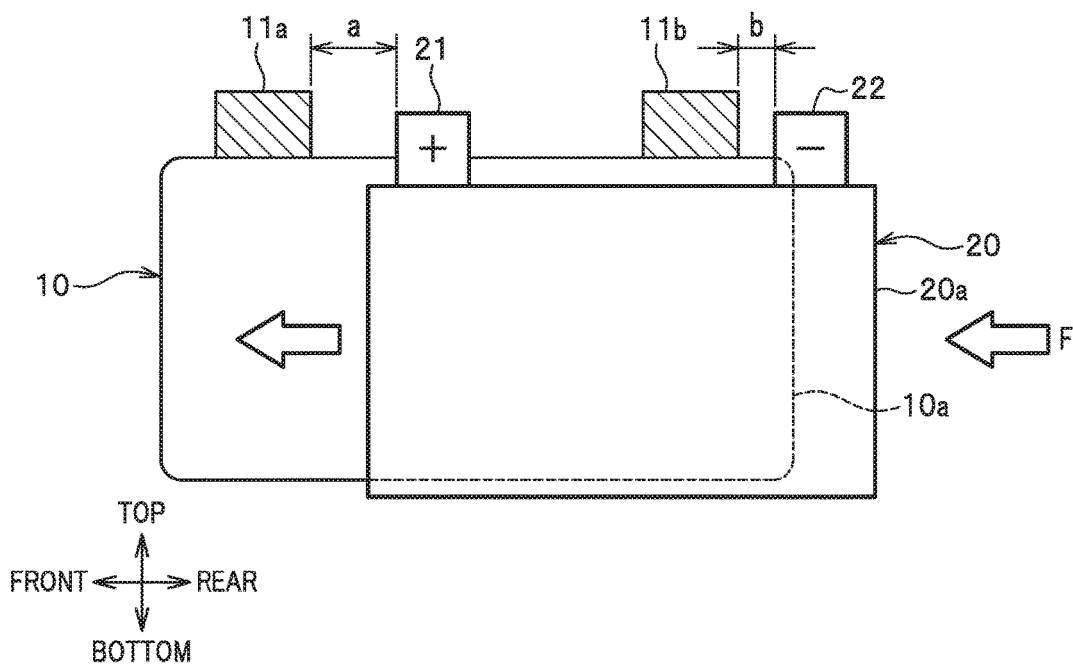
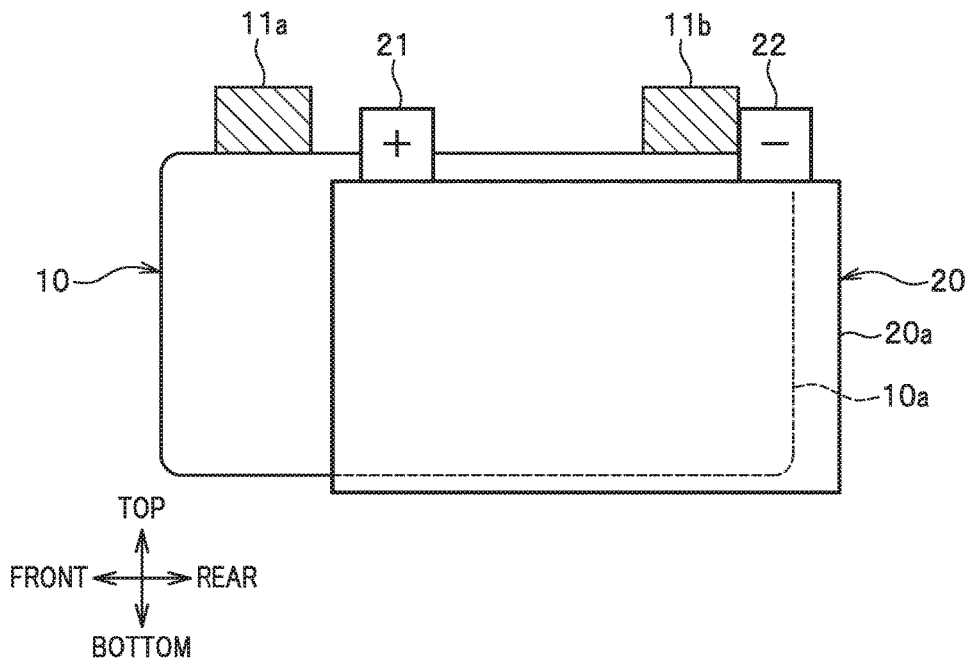

VEHICLE BODY STRUCTURE

BACKGROUND OF THE INVENTION

1. Field of the Invention

The present invention relates to a vehicle body structure of an automobile.

2. Description of the Related Art

Japanese Patent Application Publication No. 2017-69034 describes a vehicle body structure having a vehicle battery (high-voltage battery) disposed in a tire pan provided in a trunk of a vehicle.

However, the vehicle body structure described in Japanese Patent Application Publication No. 2017-69034 has a problem of an increase in weight since a case or frame surrounding the vehicle battery needs to have its strength and stiffness enhanced to protect the vehicle battery (high-voltage battery) in the event of rear-end collision.

SUMMARY OF THE INVENTION

The present invention has been made to solve the above problems and makes it an object thereof to provide a vehicle body structure capable of protecting a vehicle battery while suppressing an increase in weight.

A vehicle body structure of the present invention includes: a recess formed in a floor panel of a trunk of a vehicle; a drive power supply device that supplies power to drive the vehicle; and an auxiliary power supply device that supplies power to auxiliary machinery mounted on the vehicle, wherein the auxiliary power supply device is configured as an auxiliary power supply device structure by being fixed to a pedestal formed in the recess, the drive power supply device is disposed side by side in a vehicle width direction with the auxiliary power supply device in the recess, and the auxiliary power supply device structure has a rear end positioned behind a rear end of the drive power supply device in a vehicle front-rear direction.

According to the present invention, a vehicle body structure capable of protecting a vehicle battery while suppressing an increase in weight can be provided.

BRIEF DESCRIPTION OF THE DRAWINGS

FIGS. 4A and 4B are side views showing a positional relationship between a fixing frame and terminals, FIG. 4A showing a state before rear-end collision and FIG. 4B showing a state in the event of rear-end collision.

DETAILED DESCRIPTION OF THE EMBODIMENTS

Embodiments of the present invention will be hereinafter described in detail with reference to the accompanying drawings. Note that a vehicle having a vehicle body structure according to this embodiment is applicable to various types of vehicles equipped with a high-voltage power supply device to drive a vehicle, such as a hybrid vehicle with an engine (internal combustion engine) and a motor (not shown) as drive sources, and an electric vehicle or fuel cell vehicle with a motor (not shown) as a drive source. Also, such vehicles are not limited to four-wheel vehicles but also applicable to other vehicles such as three-wheel vehicles and two-wheel vehicles. Moreover, "front-rear", "left-right", and "top-bottom" shown in each of the drawings represent a vehicle front-rear direction, a vehicle width direction (left-right direction), and a vehicle top-bottom direction (vertical top-bottom direction), respectively.

First Embodiment

Figure 1:
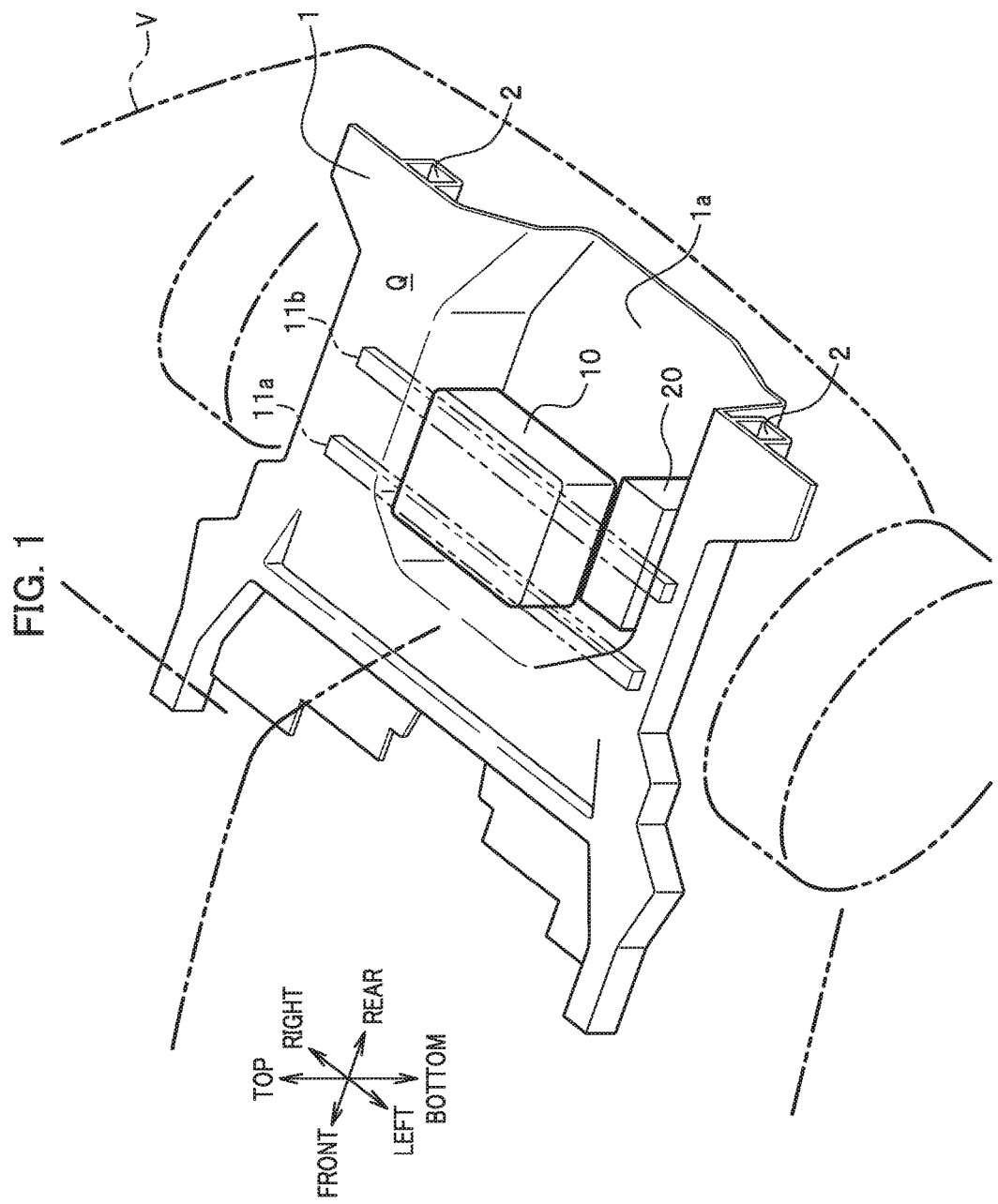
FIG. 1 is a perspective view showing a vehicle body structure according to a first embodiment.

FIG. 1 is a perspective view showing a vehicle body structure according to a first embodiment. Note that FIG. 1 shows a state of a rear part of a vehicle body of a vehicle V as viewed from diagonally backward left, and the contour of the vehicle V is indicated by the two-dot chain line.

As shown in FIG. 1, the vehicle V having the vehicle body structure of the first embodiment includes a recess 1a formed in a rear floor panel 1 (floor panel), a drive power supply device 10 that supplies power to drive (run) the vehicle V, and an auxiliary power supply device 20 that supplies power to auxiliary machinery (not shown) mounted on the vehicle V. Note that, as for the recess 1a shown in FIG. 1, the illustration of the rear end of the recess 1a is cut out and omitted, but the rear end also has a wall formed so as to stand up from the bottom surface in the same way as its surrounding.

The rear floor panel 1 forms a floor surface of a trunk Q of the vehicle V, and is disposed between a pair of rear side frames 2 and 2 disposed so as to be spaced apart from each other in the left-right direction. The rear side frames 2 and 2 are configured so as to extend in the front-rear direction on the inside of left and right rear wheels. Also, in the rear floor panel 1, the recess 1a is formed such that a recess surface thereof faces upward. This recess 1a is a portion that is so-called tire pan. Note that, although not shown, a rear cross member is provided between the rear side frames 2 and 2, for example, in front of the recess 1a. Moreover, the shape of the recess 1a is not particularly limited as long as the drive power supply device 10 and the auxiliary power supply device 20 can be disposed side by side therein in the vehicle width direction, including a circular shape, a rectangular shape, a polygonal shape, a variant shape, and the like in a plan view.

The drive power supply device 10 has a high-voltage (for example, 300 volts) battery (high-voltage battery) to supply power to a motor that drives wheels (for example, a front wheel and/or the rear wheel). This battery is configured by arranging a plurality of battery modules in the vehicle front-rear direction and in the vehicle width direction, each battery module including a plurality of battery cells arranged in the thickness direction.

Moreover, the drive power supply device 10 is configured by combining the battery described above and a power control unit (PCU). The PCU is configured by combining an inverter, a DC-DC converter, a contactor for opening and closing an electric circuit, and the like. For example, in the drive power supply device 10, the battery is disposed on the lower side and the PCU is disposed above the battery.

The battery provided in the drive power supply device 10 is a high-voltage battery capable of output of several hundred volts, for example, and includes a secondary battery such as a lithium-ion secondary battery and a nickel-metal-hydride secondary battery. Note that the drive power supply device 10 is not limited to the one configured by combining the high-voltage battery with the PCU, but may simply be one including only the high-voltage battery.

The auxiliary power supply device 20 is a low-voltage device (low-voltage battery) capable of output of 12 volts, for example, and includes a secondary battery such as a lead battery. Also, the auxiliary power supply device 20 is smaller and lighter than the drive power supply device 10. Note that the auxiliary power supply device 20 supplies power to a cell motor for starting the engine, an air conditioner, lamps (headlights, brake lamps, interior lights, and instrumental panels) and the like as the auxiliary machinery.

In the recess 1a of the rear floor panel 1, the drive power supply device 10 and the auxiliary power supply device 20 are disposed side by side in the vehicle width direction (left-right direction). Note that, although the drive power supply device 10 is disposed on the right side and the auxiliary power supply device 20 is disposed on the left side in FIG. 1, this arrangement may be reversed.

The drive power supply device 10 is fixed to the rear floor panel 1 by a fixing frame 11. The fixing frame 11 includes a pair of plate-shaped frame parts 11a and 11b extending in the vehicle width direction. The pair of frame parts 11a and 11b are spaced apart from each other in the front-rear direction and also disposed parallel to each other. Also, the frame parts 11a and 11b have a length extending to upper surfaces of the left and right rear side frames 2 and 2, and are fixed to the upper surfaces of the rear side frames 2 and 2 with bolts and the like.

The frame parts 11a and 11b are positioned on the upper surface of the drive power supply device 10 to fix the drive power supply device 10 in a suspended state.

Figure 2:
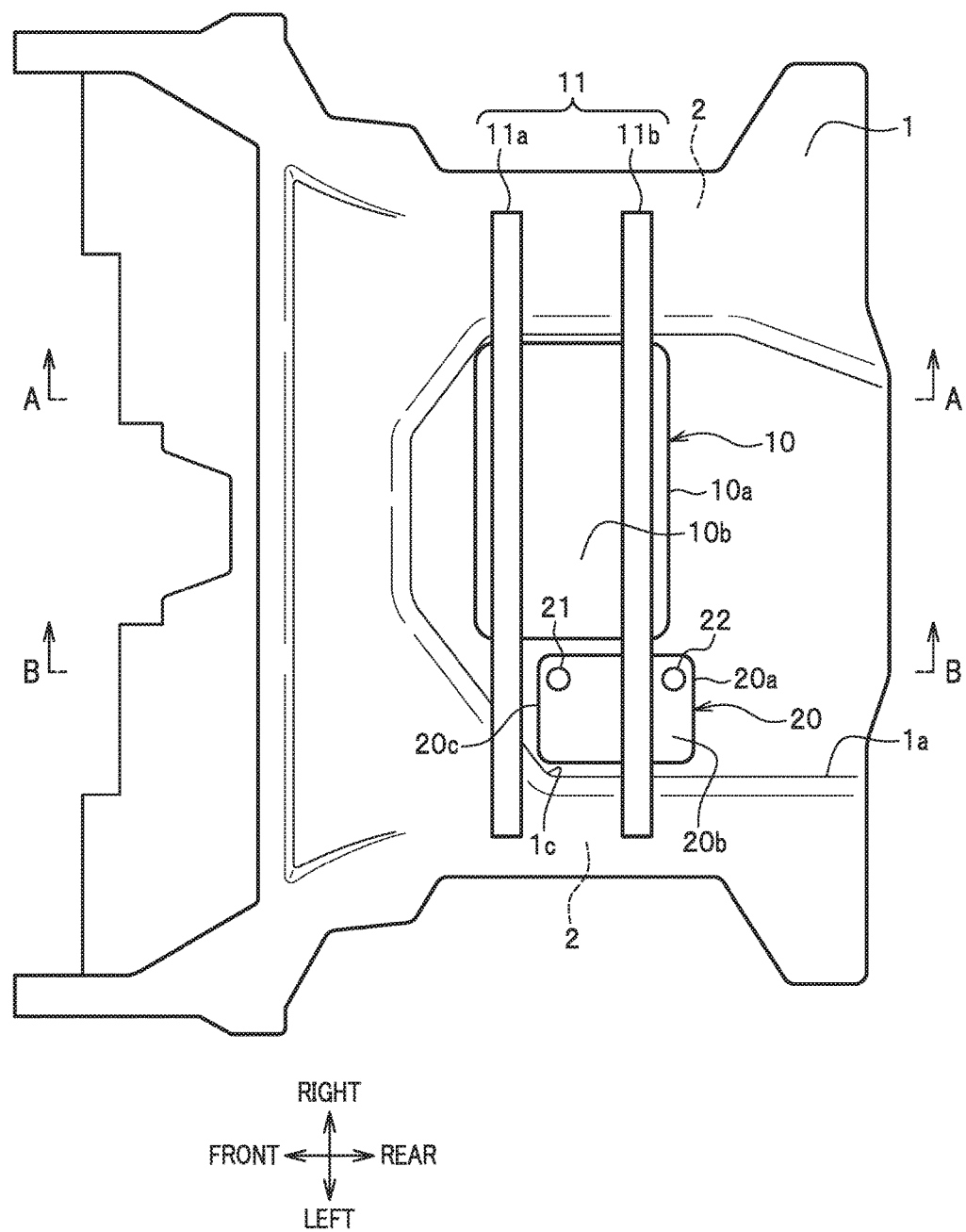
FIG. 2 is a plan view showing the vehicle body structure according to the first embodiment.

FIG. 2 is a plan view showing the vehicle body structure according to the first embodiment.

As shown in FIG. 2, the auxiliary power supply device 20 has a rectangular shape in the plan view and is disposed so as to be longitudinally long in the front-rear direction such that the long side faces the vehicle width direction and the short side faces the front-rear direction. Also, the auxiliary power supply device 20 has a rear end 20a positioned behind a rear end 10a of the drive power supply device 10 in the front-rear direction (vehicle front-rear direction) of the vehicle V (see FIG. 1). In other words, the auxiliary power supply device 20 protrudes rearward beyond the rear end 10a of the drive power supply device 10.

Moreover, on an upper surface 20b of the auxiliary power supply device 20, a pair of terminals 21 and 22 are formed so as to protrude upward. For example, one (front) terminal 21 is a positive electrode and the other (rear) terminal 22 is a negative electrode. These terminals 21 and 22 are positioned at corners of the upper surface 20b of the auxiliary power supply device 20 on the drive power supply device 10 side.

The front terminal 21 is positioned between the frame parts 11a and 11b. The rear terminal 22 is positioned behind the frame part 11b. In this way, the frame parts 11a and 11b and the terminals 21 and 22 are alternately disposed in the front-rear direction.

Moreover, the terminal 21 is spaced apart rearward from the frame part 11a, while the terminal 22 is spaced apart rearward from the frame part 11b.

Furthermore, the auxiliary power supply device 20 has a front end 20c in contact with a wall surface 1c (contact surface) included in a sidewall of the recess 1a. Note that the present invention is not limited to the configuration in which the front end 20c and the wall surface 1c come into point contact with each other, but is also applicable to a configuration in which the front end 20c and the wall surface 1c come into surface contact with each other by forming a surface, in the wall surface 2c, that comes into contact with the front end 20c.

Figure 3A:
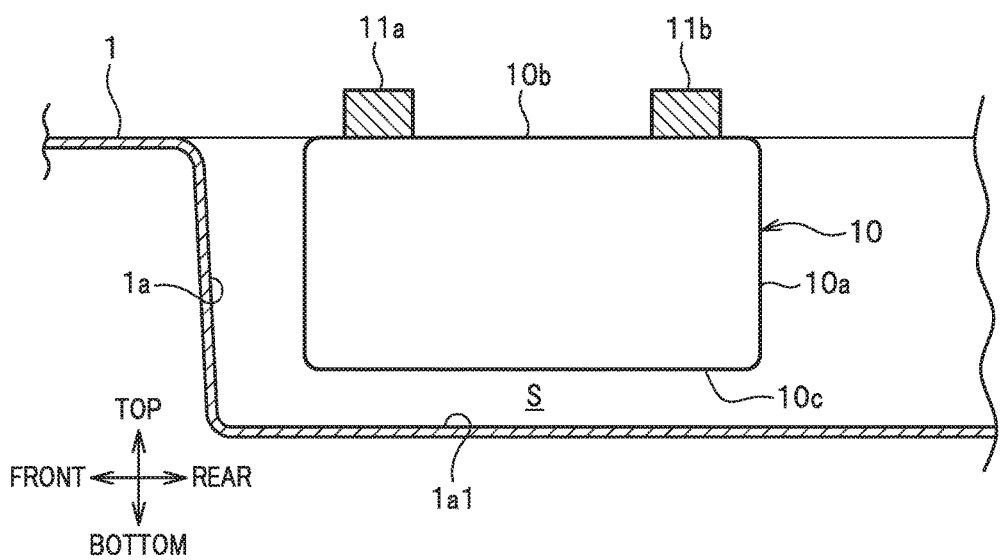
FIG. 3A is a cross-sectional view taken along the line A-A in FIG. 2
Figure 3B:
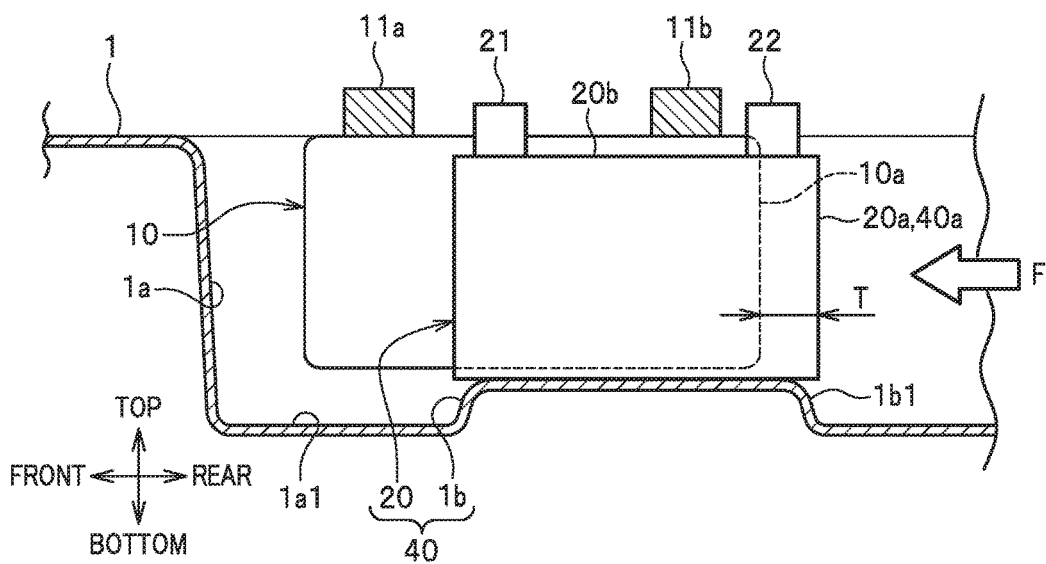
FIG. 3B is a cross-sectional view taken along the line B-B in FIG. 2.

FIG. 3A is a cross-sectional view taken along the line A-A in FIG. 2 and FIG. 3B is a cross-sectional view taken along the line B-B in FIG. 2. Note that the illustrations of the insides of the drive power supply device 10 and of the auxiliary power supply device 20 are omitted.

As shown in FIG. 3A, the frame parts 11a and 11b are fixed to an upper surface 10b of the drive power supply device 10 with their lower surfaces in contact therewith. Note that unillustrated brackets are attached to the drive power supply device 10, and these brackets are fixed to the frame parts 11a and 11b.

Moreover, the drive power supply device 10 is configured to be suspended from the frame parts 11a and 11b. Also, a gap (space) S is formed between a lower surface 10c of the drive power supply device 10 and a bottom surface 1a1 of the recess 1a.

As shown in FIG. 3B, the auxiliary power supply device 20 is fixed to an upper surface of a pedestal 1b formed in the recess 1a. This pedestal 1b is formed so as to protrude upward from the bottom surface 1a1 of the recess 1a. Note that a method for fixing the auxiliary power supply device 20 to the pedestal 1b is not particularly limited as long as the auxiliary power supply device 20 can be firmly fixed to the pedestal 1b. For example, a rigid plate material may be disposed around the auxiliary power supply device 20 and then have both ends fixed to the pedestal 1b with bolts.

Moreover, the pedestal 1b has a shape that does not protrude outward (laterally) from the auxiliary power supply device 20 in the plan view of the auxiliary power supply device 20 (see FIG. 2). Also, the pedestal 1b has a rear end 1b1 formed at a position that does not protrude rearward from the rear end 20a of the auxiliary power supply device 20.

As described above, in the first embodiment, the auxiliary power supply device 20 and the pedestal 1b form an auxiliary power supply device structure 40. In the auxiliary power supply device structure 40, the rear end 20a of the auxiliary power supply device 20 is positioned at the rearmost end in the front-rear direction of the vehicle V (see FIG. 1). In the first embodiment, the rear end 20a of the auxiliary power supply device 20 is positioned behind the rear end 10a of the drive power supply device 10 in the front-rear direction.

With the drive power supply device 10 and the auxiliary power supply device 20 arranged as described above, even if a load F (see FIG. 3B) is applied that deforms the vehicle when another vehicle collides from behind (hereinafter referred to as "in the event of vehicle rear-end collision"), the auxiliary power supply device 20 receives the load F before the drive power supply device 10. Thus, the momentum of deformation of the vehicle body (body) can be reduced by the auxiliary power supply device 20 absorbing the load (energy) F. Accordingly, the drive power supply device 10 equipped with the high-voltage battery can be protected.

Moreover, the frame parts 11a and 11b and the terminals 21 and 22 are disposed at positions overlapping with each other in the front-rear direction (horizontal direction). In other words, the frame parts 11a and 11b and the terminals 21 and 22 are configured so as to have approximately the same height. Note that the horizontal direction means a plane formed by the front-rear direction and the left-right direction. With such arrangement, the frame parts 11a and 11b and the terminals 21 and 22 do not overlap with each other in the top-bottom direction. Thus, the terminals 21 and 22 can be exposed upward from the frame parts 11a and 11b, thus facilitating the maintenance of the auxiliary power supply device 20.

Note that the pedestal 1b has the shape protruding from the bottom surface 1a1 of the recess 1a in the first embodiment, but may also have a shape not protruding from the bottom surface 1a1. In such a case, a rear end 40a of the auxiliary power supply device structure 40 serves as the rear end 20a of the auxiliary power supply device 20.

FIGS. 4A and 4B are side views showing a positional relationship between the fixing frame and the terminals, FIG. 4A showing a state before rear-end collision and FIG. 4B showing a state in the event of rear-end collision. Note that, in FIGS. 4A and 4B, the illustration of the recess 1a of the rear floor panel 1 is omitted.

As shown in FIG. 4A, in the state before rear-end collision, a>b is established assuming that a distance between the frame part 11a and the terminal 21 (one terminal) is reference numeral a and a distance between the frame part 11b and the terminal 22 (the other terminal) is reference numeral b.

Even if the auxiliary power supply device 20 is pushed forward (see the white arrows in FIG. 4A) under the load F in the event of vehicle rear-end collision and the rear terminal 22 comes into contact with the rear frame part 11b as shown in FIG. 4B, the front terminal 21 and the front frame part 11a do not come into contact with each other. This prevents short-circuiting of the auxiliary power supply device 20, thus making it possible to prevent scattering of a fluid (battery fluid) caused by such short-circuiting.

Note that the distance a between the frame part 11a and the terminal 21 is preferably set to a value that allows the terminal 22 to come into contact with the frame part 11b up to a point before the terminal 22 comes off the auxiliary power supply device 20. Thus, the short-circuiting of the auxiliary power supply device 20 can be surely prevented.

As described above, the vehicle body structure of the first embodiment includes: the recess 1a formed in the rear floor panel 1 in the trunk Q of the vehicle V; the drive power supply device 10 that supplies power to drive the vehicle V; and the auxiliary power supply device 20 that supplies power to the auxiliary machinery mounted on the vehicle V (see FIG. 1). The auxiliary power supply device 20 is configured as the auxiliary power supply device structure 40 by being fixed to the pedestal formed in the recess 1a (see FIG. 3B). In the recess 1a, the drive power supply device 10 is disposed side by side in the vehicle width direction with the auxiliary power supply device 20. Furthermore, the rear end 20a of the auxiliary power supply device (the rear end 40a of the auxiliary power supply device structure 40) is positioned behind the rear end 10a of the drive power supply device 10 in the front-rear direction of the vehicle V (see FIG. 3B).

Thus, a protective stroke T (see FIG. 3B) for the drive power supply device 10 can be ensured. Moreover, reaction force can be generated by the auxiliary power supply device 20 crashing before the drive power supply device 10 in the event of vehicle rear-end collision. This eliminates the need to improve the strength and stiffness of a case, the frame parts 11a and 11b, and the like of the drive power supply device 10, thus making it possible to suppress an increase in weight.

Moreover, in the first embodiment, the drive power supply device 10 and the auxiliary power supply device 20 are disposed side by side in the vehicle width direction. Thus, the drive power supply device 10 can be disposed closer to the front side of the vehicle V compared with the case where the drive power supply device 10 and the auxiliary power supply device 20 are disposed side by side in the front-rear direction (case where the drive power supply device 10 is disposed on the rear side and the auxiliary power supply device 20 is disposed on the front side). Therefore, the inertia mass can be set close to the center of gravity of the vehicle V, and motion performance can also be improved.

Moreover, in the first embodiment, the drive power supply device 10 is supported in the suspended state by the frame part 11a attached to the rear floor panel 1, and the space S (see FIG. 3A) is formed between the drive power supply device 10 and the bottom surface 1a1 of the recess 1a. Accordingly, even if the bottom surface 1a1 of the recess 1a is deformed in the event of vehicle rear-end collision, the space S (see FIG. 3A) prevents deformation load from being applied to the drive power supply device 10. As a result, the drive power supply device 10 can be protected.

Moreover, in the first embodiment, the fixing frame 11 includes the pair of frame parts 11a and 11b disposed so as to extend in the vehicle width direction and to be spaced apart from each other in the front-rear direction. The auxiliary power supply device 20 includes the pair of terminals 21 and 22 disposed so as to be spaced apart from each other in the vehicle front-rear direction. The front terminal 21 of the pair of terminals 21 and 22 is positioned between the pair of frame parts 11a and 11b, while the rear terminal 22 of the pair of terminals 21 and 22 is positioned behind the rear frame part 11b. Moreover, the distance a between the front frame part 11a and the front terminal 21 is set longer than the distance b between the rear frame part 11b and the rear terminal 22 (see FIG. 4A). Thus, short-circuiting of the auxiliary power supply device 20 can be prevented in the event of vehicle rear-end collision.

Moreover, in the first embodiment, the pair of terminals 21 and 22 are disposed at the positions overlapping with the frame parts 11a and 11b in the front-rear direction (horizontal direction). This makes it easier to access the auxiliary power supply device 20. Thus, maintainability of the auxiliary power supply device 20 can be improved.

Moreover, in the first embodiment, the recess 1a has the wall surface 1c that comes into contact with the auxiliary power supply device 20 at the front end 20c of the auxiliary power supply device 20 (see FIG. 2). Therefore, even if a load is generated that pushes forward the auxiliary power supply device 20 in the event of vehicle rear-end collision, the front end 20c of the auxiliary power supply device 20 comes into contact with the wall surface 1c of the recess 1a. This makes it possible to increase the reaction force compared with a non-contact configuration. Thus, the drive power supply device 10 can be more securely protected.

Second Embodiment

Figure 5:
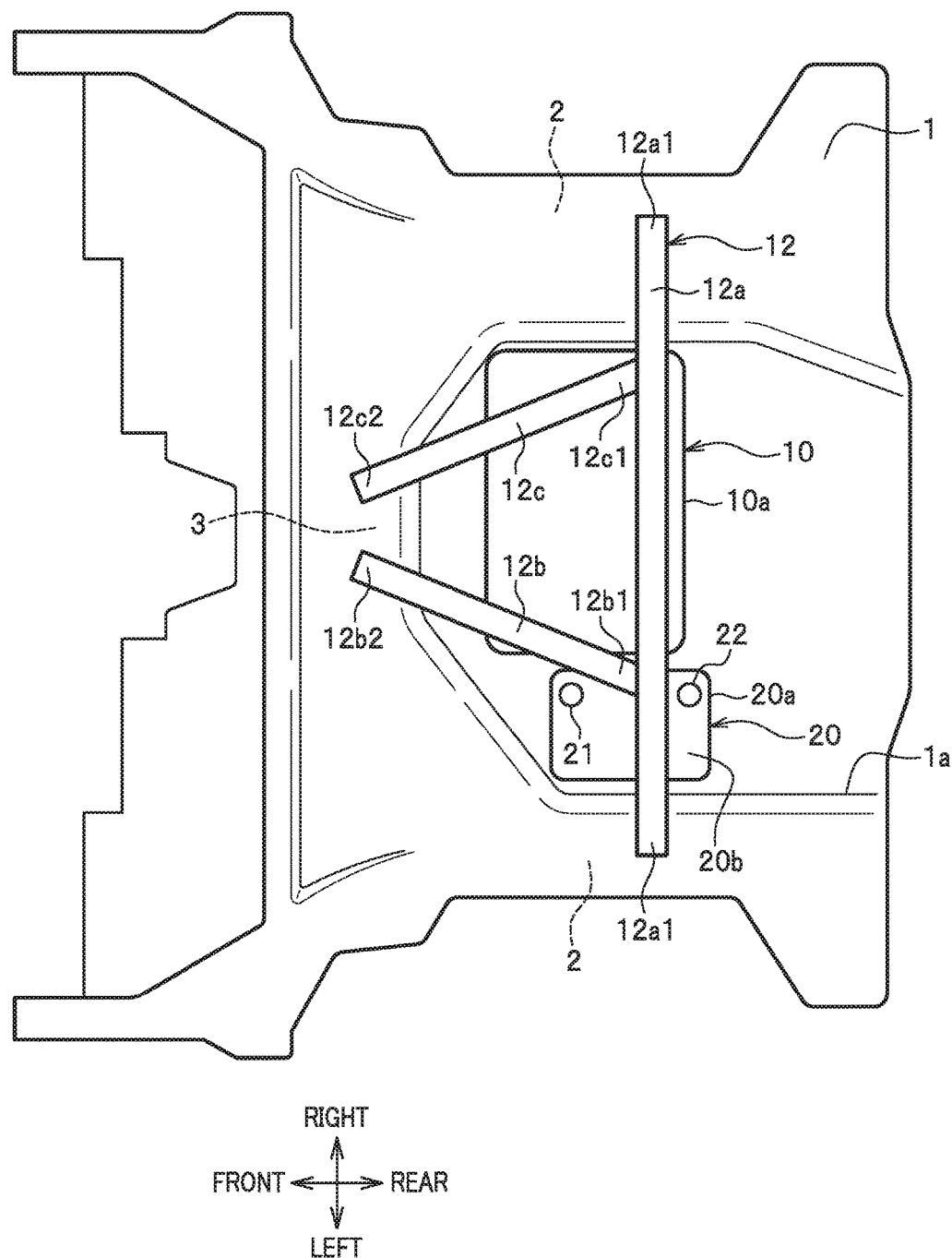
FIG. 5 is a plan view showing a vehicle body structure according to a second embodiment.

FIG. 5 is a plan view showing a vehicle body structure according to a second embodiment. Note that the same constituent components as those of the first embodiment are denoted by the same reference numerals, and repetitive description thereof is omitted.

The vehicle body structure of the second embodiment includes a fixing frame 12 in place of the fixing frame 11 in the first embodiment. The fixing frame 12 supports an auxiliary power supply device 20, and includes a first frame part 12a and second frame parts 12b and 12c.

The first frame part 12a is formed of a plate-like member extending linearly in the vehicle width direction (left-right direction). Also, both ends 12a1 and 12a1 of the first frame part 12a in the vehicle width direction extend to rear side frames 2 and 2, and are fixed to the rear side frames 2 and 2 with bolts and the like.

The second frame parts 12b and 12c are formed of plate-like members, which extend forward from the first frame part 12a beyond a recess 1a. Also, the second frame parts 12b and 12c have their base ends 12b1 and 12c1 joined to the first frame part 12a so as to be spaced apart from each other in the vehicle width direction approximately by the width of the drive power supply device 10. Moreover, the second frame parts 12b and 12c are disposed so as to be tilted relative to the vehicle front-rear direction such that the closer to the front, the closer to the center in the vehicle width direction. Meanwhile, the second frame parts 12b and 12c have their leading ends 12b2 and 12c2 joined to a rear cross member 3 joined between the rear side frames 2 and 2. By supporting the drive power supply device 10 at four points including the base ends 12a1 and 12a1 of the first frame part 12a and the leading ends 12b2 and 12c2 of the second frame parts 12b and 12c as described above, the drive power supply device 10 can be stably supported.

Moreover, one (left) second frame part 12b extends forward passing closer to the drive power supply device 10 than the front terminal 21 of the auxiliary power supply device 20.

Furthermore, the drive power supply device 10 is supported in a suspended state by the fixing frame 12 attached to the rear floor panel 1, as in the case of the first embodiment. Meanwhile, the terminal 21 (one of the terminals) of the auxiliary power supply device 20 is disposed at a position overlapping with the fixing frame 12 (the first frame part 12a and the second frame parts 12b and 12c) in the horizontal direction. This makes it easier to access the auxiliary power supply device 20. Thus, maintainability of the auxiliary power supply device 20 can be improved.

In the second embodiment with the above configuration, the auxiliary power supply device 20 includes a pair of terminals 21 and 22 disposed so as to be spaced apart from each other in the vehicle front-rear direction. The fixing frame 12 includes: the first frame part 12a extending in the vehicle width direction (vehicle left-right direction) between the pair of terminals 21 and 22; and the second frame parts 12b and 12c extending forward from the first frame part 12a on the side closer to the drive power supply device 10 than the pair of terminals 21 and 22. Therefore, the fixing frame (second frame part 12b) is not disposed at the position overlapping with the front terminal 21 in the front-rear direction. Thus, even if the auxiliary power supply device 20 is pushed forward and the rear terminal 22 comes into contact with the first frame part 12a in the event of vehicle rear-end collision, the other terminal 21 does not come into contact with the fixing frame 12. Accordingly, short-circuiting of the auxiliary power supply device 20 can be prevented.

Note that the configuration of the fixing frame 12 is not limited to that of the second embodiment, but may be changed as appropriate according to the size of the drive power supply device 10, and the like. For example, the second frame parts 12b and 12c may be disposed parallel to each other in the vehicle front-rear direction. Also, the number of the first frame parts 12a and the number of the second frame parts 12b and 12c may be changed as appropriate.

Third Embodiment

Figure 6:
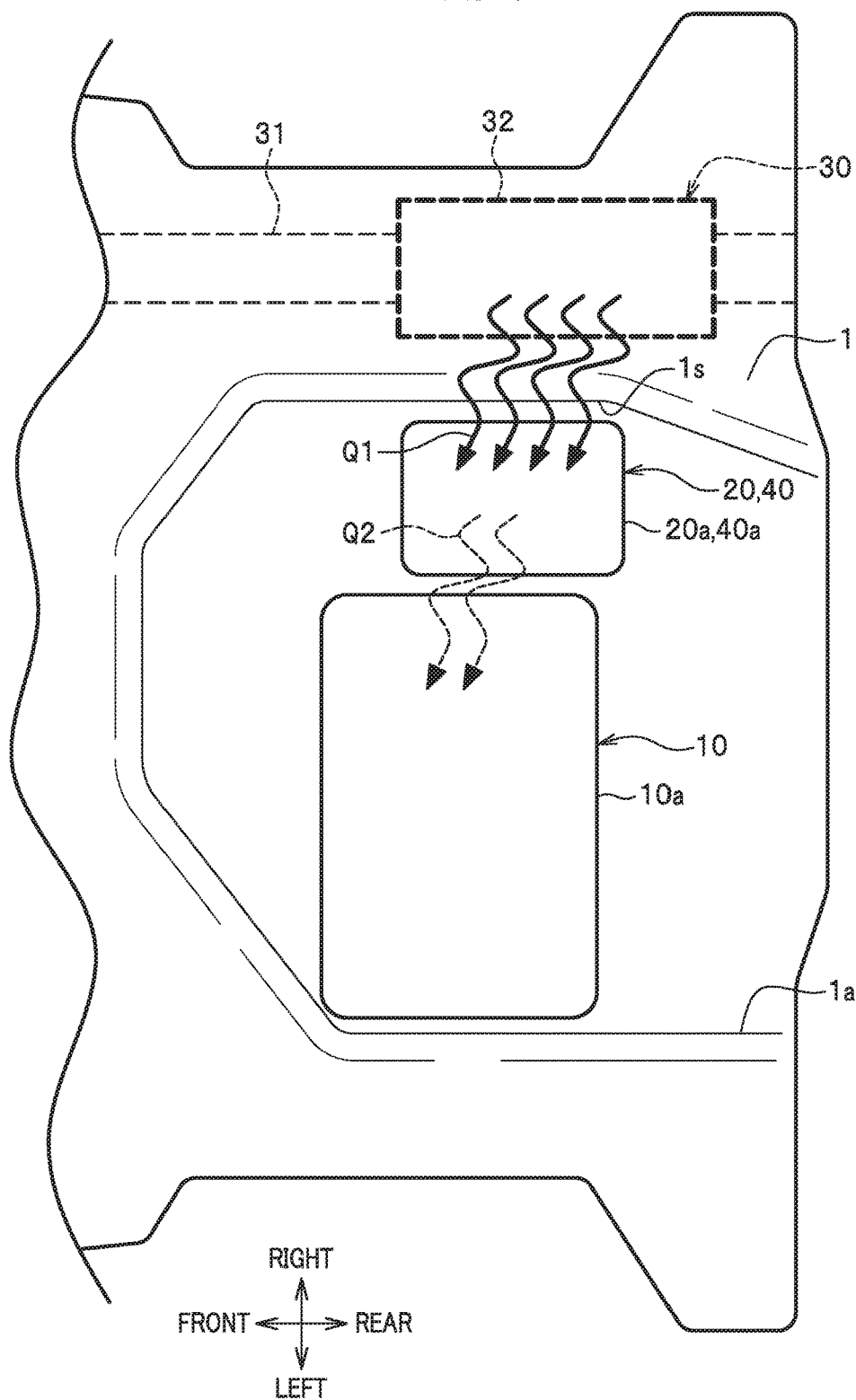
FIG. 6 is a plan view showing a vehicle body structure according to a third embodiment.

FIG. 6 is a plan view showing a vehicle body structure according to a third embodiment.

As shown in FIG. 6, the vehicle body structure of the third embodiment is applied to a vehicle with an engine (internal combustion engine). For example, the engine is installed inside an engine room in a front part of a vehicle body. Also, the engine has an exhaust device 30 connected thereto, which discharges emissions after combustion to the outside of a vehicle. The exhaust device 30 is configured by combining a purification system (unillustrated), an exhaust pipe 31, a muffling device (muffler) 32, and the like.

The exhaust pipe 31 and the muffling device 32 are disposed on the lower side of a rear floor panel 1. The muffling device 32 is positioned to the right of a recess 1a formed in the rear floor panel 1.

A drive power supply device 10 is disposed side by side with an auxiliary power supply device 20 in the vehicle width direction (vehicle left-right direction). Also, in the third embodiment, the drive power supply device 10 is positioned on the left side, while the auxiliary power supply device 20 is positioned on the right side. Moreover, an auxiliary power supply device structure 40 has a rear end 40a positioned behind a rear end 10a of the drive power supply device 10 in the vehicle front-rear direction, as in the case of the first embodiment.

The auxiliary power supply device 20 is disposed inside a sidewall (peripheral wall) is that forms a periphery of the recess 1a. The exhaust device 30 is disposed outside the sidewall 1s that forms the recess 1a. Although the muffling device 32 of the exhaust device 30 is disposed side by side in the vehicle width direction with the auxiliary power supply device 20 in the third embodiment, the exhaust pipe 31 of the exhaust device 30 may be disposed side by side in the vehicle width direction with the auxiliary power supply device 20.

Meanwhile, the drive power supply device 10 has higher temperature dependence than the auxiliary power supply device 20. That is, the auxiliary power supply device 20 has a high-temperature tolerance and thus its performance is not degraded even when the temperature gets somewhat higher. Therefore, in the third embodiment, the auxiliary power supply device 20 is disposed between the drive power supply device 10 and the exhaust device 30. In other words, the drive power supply device 10 is provided on the opposite side of the auxiliary power supply device 20 to the exhaust device 30 in the vehicle width direction. The exhaust device 30 becomes a high-temperature heating element when emissions from the engine flow therethrough, and releases heat around the exhaust device 30.

Heat Q1 released from the exhaust device 30 is transferred to the auxiliary power supply device 20 through the sidewall is of the recess 1a, but is blocked by the auxiliary power supply device 20 serving as a wall. More specifically, the auxiliary power supply device 20 functions as a wall that blocks heat as the temperature rises through absorption of the heat Q1. Then, heat Q2 released from the auxiliary power supply device 20 is transferred to the drive power supply device 10 as heat (low heat) with a temperature lower than that of the heat Q1. Thus, the drive power supply device 10 is protected from high temperature heat released from the exhaust device 30.

In the third embodiment, the drive power supply device 10 is positioned on the opposite side of the auxiliary power supply device 20 to the exhaust device 30 in the vehicle width direction. In this way, the auxiliary power supply device 20 is provided as a shield between the drive power supply device 10 and the exhaust device 30. Thus, the auxiliary power supply device 20 serves as a heat transfer inhibitor that blocks heat from the exhaust device 30, and thus can assist cooling of the drive power supply device 10. Moreover, there is no need to provide an additional heat insulator between the drive power supply device 10 and the exhaust device 30. This allows for a low-cost configuration.

Fourth Embodiment

Figure 7:
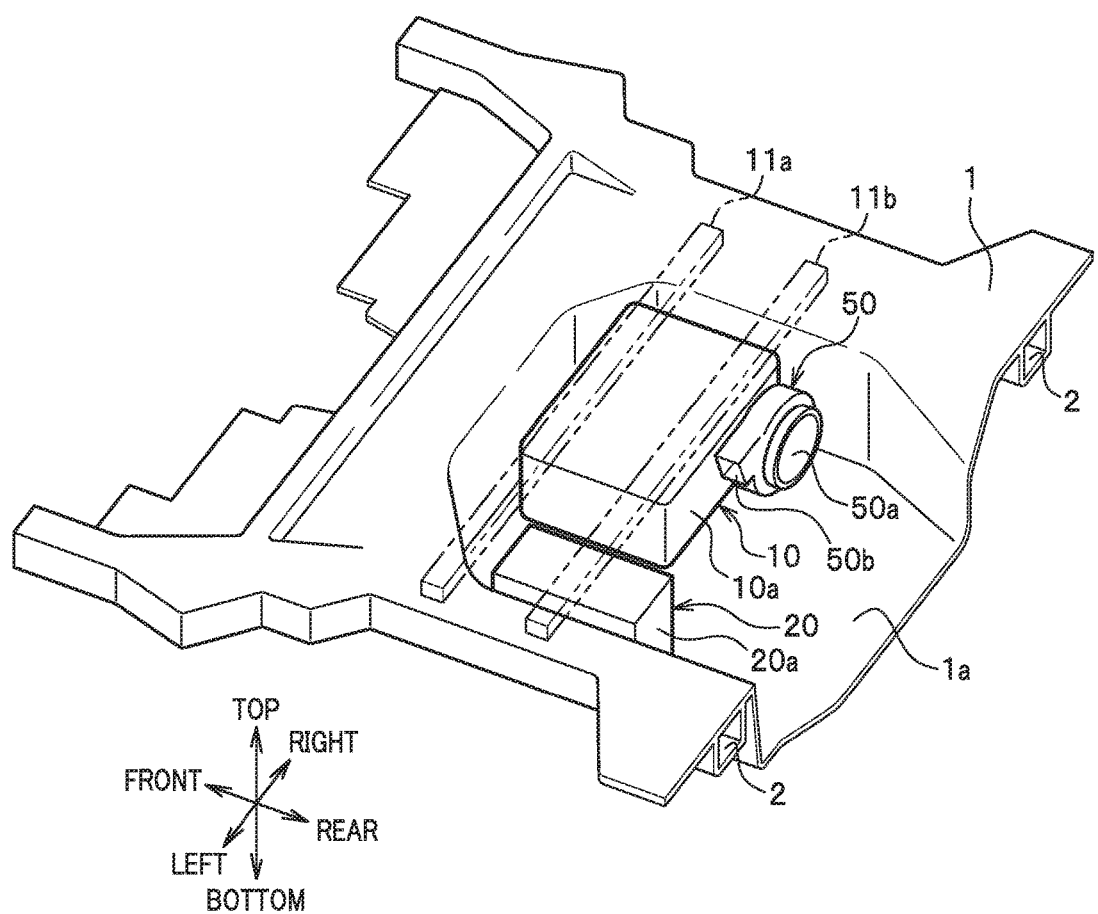
FIG. 7 is a perspective view showing a vehicle body structure according to a fourth embodiment.

FIG. 7 is a perspective view showing a vehicle body structure according to a fourth embodiment.

As shown in FIG. 7, the vehicle body structure of the fourth embodiment has a configuration obtained by adding a cooling fan 50 for cooling a drive power supply device 10 to the vehicle body structure of the first embodiment. The cooling fan 50 has a configuration including an impeller provided in a fan case made of resin, for example, and is attached to a rear surface (rear end 10a) of the drive power supply device 10. A cooling unit including the cooling fan 50 supplies air taken from the vehicle interior, for example, to the auxiliary power supply device 20 through an unillustrated duct. In the auxiliary power supply device 20, battery cells are cooled by the air passing through gaps formed between the battery cells, and then the PCU is cooled. Thereafter, the air after the cooling is discharged to the recess 1a from a discharge outlet 50b of the cooling fan 50. Note that a rear end 50a of the cooling fan 50 may be either in front of or behind a rear end 20a of the auxiliary power supply device 20 (rear end 40a of the auxiliary power supply device structure 40, see FIG. 3B). Moreover, in the fourth embodiment, the drive power supply device 10 can be efficiently cooled by using the air in the air-conditioned vehicle interior.

In the fourth embodiment, the cooling fan 50 for cooling the drive power supply device 10 is provided at the rear end 10a (rear end) of the drive power supply device 10. Accordingly, the cooling fan 50 can function as a shock absorber by breaking under a load in the event of vehicle rear-end collision. Thus, the drive power supply device 10 can be protected by the cooling fan 50 generating reaction force.

Fifth Embodiment

Figure 8:
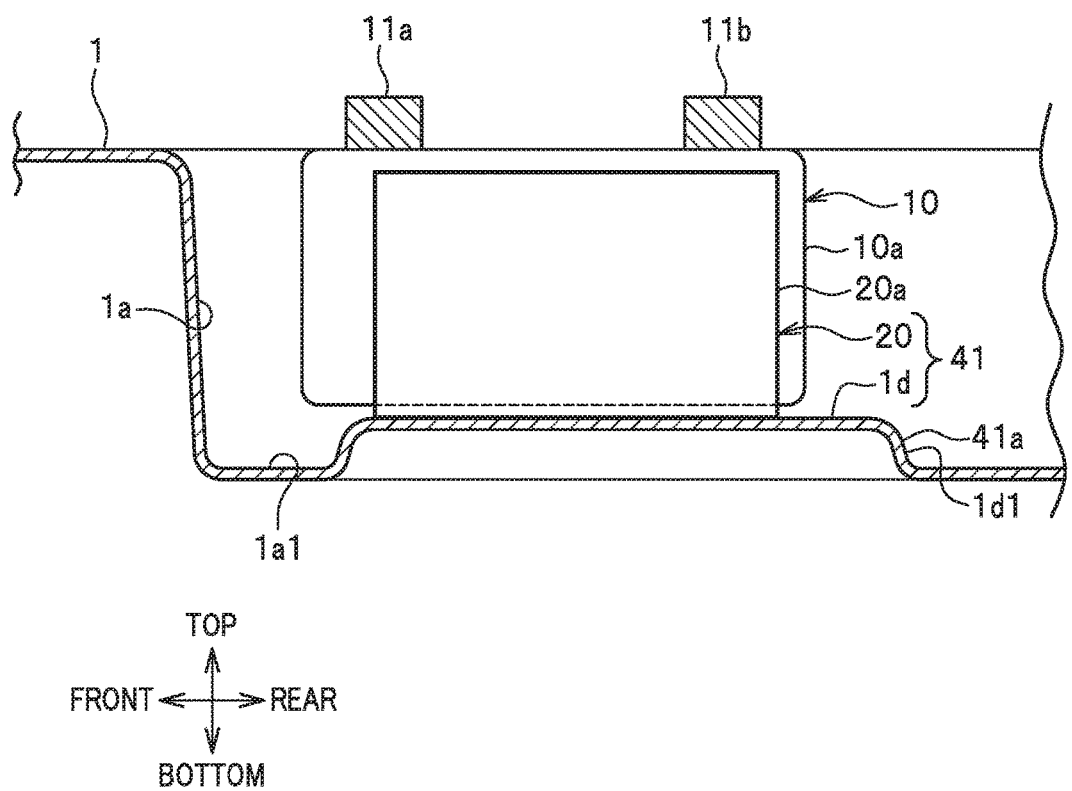
FIG. 8 is a cross-sectional view showing a vehicle body structure according to a fifth embodiment.

FIG. 8 is a cross-sectional view showing a vehicle body structure according to a fifth embodiment.

As shown in FIG. 8, in the vehicle body structure of the fifth embodiment, a pedestal 1d to fix an auxiliary power supply device 20 is formed in a bottom surface 1a1 of a recess 1a. The pedestal 1d is formed so as to be longer toward the rear in the cross-sectional view than the pedestal 1b in the first embodiment. The auxiliary power supply device 20 is firmly fixed to the pedestal 1d, as in the case of the first embodiment. Note that, in the vehicle body structure of the fifth embodiment, the auxiliary power supply device 20 and the pedestal 1d form an auxiliary power supply device structure 41.

Also, the auxiliary power supply device structure 41 has a rear end 41a positioned behind a rear end 10a of a drive power supply device 10 in the vehicle front-rear direction. Moreover, the auxiliary power supply device 20 has a rear end 20a positioned in front of the rear end 10a of the drive power supply device 10 in the vehicle front-rear direction.

In the fifth embodiment, the vehicle body structure includes: the recess 1a formed in a rear floor panel 1 in a trunk Q (see FIG. 1) of a vehicle V (see FIG. 1); the drive power supply device 10 that supplies power to drive the vehicle V; and the auxiliary power supply device 20 that supplies power to auxiliary machinery mounted on the vehicle V. The auxiliary power supply device 20 is configured as the auxiliary power supply device structure 41 by being fixed to the pedestal 1d formed in the recess 1a. The drive power supply device 10 is disposed side by side in the vehicle width direction with the auxiliary power supply device 20 inside the recess 1a. Furthermore, the auxiliary power supply device structure 41 has the rear end 41a positioned behind the rear end 10a of the drive power supply device 10 in the vehicle front-rear direction.

As described above, in the fifth embodiment, the pedestal 1d has a rear end 1d1 positioned behind the rear end 10a of the drive power supply device 10 even if the rear end 20a of the auxiliary power supply device 20 is positioned in front of the rear end of the drive power supply device 10. Thus, the rear end 41a of the auxiliary power supply device structure 41 (the rear end 1d1 of the pedestal 1d) crashes before the drive power supply device 10. Moreover, as in the case of the first embodiment, a protective stroke T (see FIG. 3B) for the drive power supply device 10 can be ensured.

Moreover, reaction force is generated by deformation of the pedestal 1d as the auxiliary power supply device 20 crashes before the drive power supply device 10 in the event of vehicle rear-end collision. This eliminates the need to improve the strength and stiffness of a case, frame parts 11a and 11b, and the like of the drive power supply device 10, thus making it possible to suppress an increase in weight. Moreover, since the drive power supply device 10 and the auxiliary power supply device 20 are disposed side by side in the vehicle width direction, the drive power supply device 10 can be disposed closer to the front side in the front-rear direction of the vehicle V (see FIG. 1) compared with the case where the drive power supply device 10 and the auxiliary power supply device 20 are disposed side by side in the front-rear direction. Therefore, the inertia mass can be set close to the center of gravity of the vehicle V, and motion performance can also be improved.

While the first to fifth embodiments have been described above, the present invention is not limited to the first to fifth embodiments but includes various modified examples. For example, the present invention may be configured by selecting and appropriately combining some of the first to fifth embodiments.

Moreover, although the rear end 20a of the auxiliary power supply device 20 is positioned in front of the rear end 10a of the drive power supply device 10 in the vehicle front-rear direction in the fifth embodiment, the present invention is not limited thereto. For example, the rear end 20a of the auxiliary power supply device 20 maybe positioned behind the rear end 10a of the drive power supply device 10 in the vehicle front-rear direction. Thus, in the event of vehicle rear-end collision, the rear end of the pedestal 1d (the rear end 41a of the auxiliary power supply device structure 41) crashes before the drive power supply device 10, and then the auxiliary power supply device 20 crashes. Accordingly, reaction force can be generated not only by the rear end 1d1 of the pedestal 1d but also by the auxiliary power supply device 20. Thus, the drive power supply device 10 can be protected more securely than the fifth embodiment.

Furthermore, although the auxiliary power supply device 20 is disposed such that the longitudinal direction faces the vehicle width direction in the plan view when the drive power supply device 10 and the auxiliary power supply device 20 are disposed side by side in the vehicle width direction in the first embodiment, the present invention is not limited thereto. For example, the auxiliary power supply device 20 may be disposed such that the longitudinal direction faces the vehicle front-rear direction in the plan view. Thus, the plane receiving a load in the event of vehicle rear-end collision can be extended compared with the first embodiment. Therefore, the reaction force can be increased, and the drive power supply device 10 can be protected more securely.

What is claimed is:

1. A vehicle body structure comprising:
a recess formed in a floor panel of a trunk of a vehicle;
a drive power supply device that supplies power to drive the vehicle; and
an auxiliary power supply device that supplies power to auxiliary machinery mounted on the vehicle, wherein
the auxiliary power supply device is configured as an auxiliary power supply device structure by being fixed to a pedestal formed in the recess, and
the drive power supply device is disposed side by side in a vehicle width direction with the auxiliary power supply device in the recess, and the auxiliary power supply device structure has a rear end positioned behind a rear end of the drive power supply device in a vehicle front-rear direction.

2. The vehicle body structure according to claim 1, wherein the drive power supply device is supported in a suspended state by a fixing frame attached to the floor panel, and a space is formed between the drive power supply device and a bottom surface of the recess.

3. The vehicle body structure according to claim 2, wherein
the fixing frame includes a pair of frame parts disposed so as to extend in the vehicle width direction and to be spaced apart from each other in the front-rear direction,
the auxiliary power supply device includes a pair of terminals disposed so as to be spaced apart from each other in the vehicle front-rear direction,
a front terminal of the pair of terminals is positioned between the pair of frame parts,
a rear terminal of the pair of terminals is positioned behind a rear frame part of the pair of frame parts, and
a distance between a front frame part of the pair of frame parts and the front terminal is set longer than a distance between the rear frame part and the rear terminal.

4. The vehicle body structure according to claim 3, wherein the pair of terminals are disposed at positions overlapping with the fixing frame in a horizontal direction.

5. The vehicle body structure according to claim 2, wherein
the auxiliary power supply device includes a pair of terminals disposed so as to be spaced apart from each other in the vehicle front-rear direction, and
the fixing frame includes a first frame part extending in the vehicle width direction between the pair of terminals and a second frame part extending forward from the first frame part on a side closer to the drive power supply device than the pair of terminals are.

6. The vehicle body structure according to claim 1, wherein the drive power supply device is positioned on an opposite side of the auxiliary power supply device to an exhaust system.

7. The vehicle body structure according to claim 1, wherein a cooling fan for cooling the drive power supply device is provided at a rear end of the drive power supply device.

8. The vehicle body structure according to claim 1, wherein the recess has a contact surface that comes into contact with the auxiliary power supply device at a front end of the auxiliary power supply device.

\* \* \* \* \*